US012755234B2

(12) United States Patent
Meyer et al.

(10) Patent No.: US 12,755,234 B2
(45) Date of Patent: Oct. 6, 2026

(54) SYSTEM AND METHOD FOR TRACKING VEHICLE TIRES IN A SERVICE SHOP ENVIRONMENT

(71) Applicant: Hunter Engineering Company, St. Louis, MO (US)

(72) Inventors: Gregory F. Meyer, St. Louis, MO (US); Alex Smith, Wentzville, MO (US); Timothy A. Strege, Sunset Hills, MO (US)

(73) Assignee: Hunter Engineering Company, Bridgeton, MO (US)

( * ) Notice: Subject to any disclaimer, the term of this patent is extended or adjusted under 35 U.S.C. 154(b) by 94 days.

(21) Appl. No.: 18/691,818

(22) PCT Filed: Sep. 12, 2022

(86) PCT No.: PCT/US2022/043241
§ 371 (c)(1),
(2) Date: Mar. 13, 2024

(87) PCT Pub. No.: WO2023/055557
PCT Pub. Date: Apr. 6, 2023

(65) Prior Publication Data
US 2024/0346430 A1 Oct. 17, 2024

Related U.S. Application Data

(60) Provisional application No. 63/249,385, filed on Sep. 28, 2021.

(51) Int. Cl.
*G06Q 10/0833* (2023.01)
*B60C 19/00* (2006.01)
(Continued)

(52) U.S. Cl.
CPC ....... *G06Q 10/0833* (2013.01); *B60C 19/003* (2013.01); *B60C 25/002* (2013.01); *G06K 19/0723* (2013.01); *G06Q 10/20* (2013.01)

(58) Field of Classification Search
None
See application file for complete search history.

(56) References Cited

U.S. PATENT DOCUMENTS 6,982,653 B2 1/2006 Voeller et al.
2005/0073435 A1 4/2005 Voeller et al.
(Continued)

FOREIGN PATENT DOCUMENTS

CN 105787618 A * 7/2016
WO WO-2004111924 A2 * 12/2004 ............. G06K 17/00
(Continued)

OTHER PUBLICATIONS

Extended European Search Report issued Apr. 25, 2025 in EP22877110.1.

(Continued)

*Primary Examiner* — Florian M Zeender
(74) *Attorney, Agent, or Firm* — Sandberg Phoenix & von Gontard, PC

(57) ABSTRACT

A system and method for utilizing identification data from RFID tags, engraved QR codes, or embossed serial numbers associated with individual tires or vehicles to monitor or track the physical location and/or condition of individual tires and/or a vehicle across multiple pieces of automotive service equipment within the service shop environment. Tire and/or vehicle identification data is communicated from automotive service equipment to a cloud-based data processing application to generate or supplement an accessible record or log of data associated with one or more pieces of
(Continued)

automotive service equipment, a vehicle service shop, an individual tire, a vehicle, or a customer.

14 Claims, 8 Drawing Sheets

(51) Int. Cl.
*B60C 25/00* (2006.01)
*G06K 19/07* (2006.01)
*G06Q 10/20* (2023.01)

(56) References Cited

U.S. PATENT DOCUMENTS

| | | | | |
|---|---|---|---|---|
| 2008/0238678 | A1* | 10/2008 | De Castro | G07C 5/085 340/572.1 |
| 2011/0153459 | A1* | 6/2011 | Kirian | G06Q 10/06 705/305 |
| 2012/0123951 | A1 | 5/2012 | Hyatt et al. | |
| 2013/0158777 | A1* | 6/2013 | Brauer | G06Q 10/20 701/31.4 |
| 2013/0159201 | A1* | 6/2013 | Kirian | G06Q 50/04 705/305 |
| 2020/0294401 | A1 | 9/2020 | Kerecsen | |
| 2021/0003481 | A1 | 1/2021 | Strege | |
| 2023/0391031 | A1* | 12/2023 | Uijlenbroek | B29D 30/0662 |

FOREIGN PATENT DOCUMENTS

| | | | | |
|---|---|---|---|---|
| WO | 2009073945 A1 | | 6/2009 | |
| WO | WO-2018220334 A1 | * | 12/2018 | G08G 1/056 |

OTHER PUBLICATIONS

International Search Report and Written Opinion for correspond PCT/US2022/043241 mailed on Feb. 28, 2023.
Anonymous, Identification of Tire Production Data During Wheel Service Procedures, IP.Com, https://ip.com/IPCOM/000243934; Oct. 28, 2015, (10 pages).

* cited by examiner

| Standard Data Content For Each Tire | | |
|---|---|---|
| **Column Header** | **Description** | **Format** |
| Manufacturer Name | Supplier Name | Alphanumeric |
| Tire Name | Tire Name | Alphanumeric |
| Tire Size | Tire Size | Alphanumeric |
| Service Description | Load and Speed Rating | Alphanumeric |
| Sidewall | BW, WW | Alphanumeric |
| Tire Identification Number (TIN) | Full DOT code as defined by FMVSS | Alphanumeric |
| Replacement Part Number | Manufacturer Part Number | Alphanumeric |
| Construction (Ply Composition / Material) | Number of plys, type, and location | Alphanumeric |
| Special Characteristics | Sealant, Run Flat, Rim Protector | Alphanumeric |
| Type | All Season, Winder, High Performance, etc. | Alphanumeric |
| UTOG | Wear, Traction, Temperature | Alphanumeric |
| Max Inflation Pressure | Max Inflation Pressure | Alphanumeric |
| Label Markings | ECE or others, Rolling Resistance, Traction, Noise | Alphanumeric |
| Certification Markings | Certs | Alphanumeric |
| Open | Open | Alphanumeric |
| Open | Open | Alphanumeric |

FIGURE 1 - PRIOR ART

SYSTEM AND METHOD FOR TRACKING VEHICLE TIRES IN A SERVICE SHOP ENVIRONMENT

CROSS-REFERENCE TO RELATED APPLICATIONS

The present application is the US National Stage under 35 U.S.C. § 371 et. seq. of International Application No. PCT/US2022/043241, filed on Sep. 12, 2022 which is related to, and claims priority from, U.S. Provisional Patent Application Ser. No. 63/249,385 field on Sep. 28, 2021, both of which are herein incorporated by reference.

STATEMENT REGARDING FEDERALLY SPONSORED RESEARCH

Not Applicable.

BACKGROUND OF THE INVENTION

The present application relates generally to an automotive service environment, and in particular, to systems and methods for utilizing networked software application to track identifiable individual vehicle tires together with an associated vehicle throughout an automotive service shop environment during vehicle service procedures.

Vehicles such as passenger cars, SUVs, light trucks, and heavy-duty trucks brought to a service shop to undergo an inspection or service arrive with an associated set of installed tires. During the inspection and/or service procedures, the individual wheels and/or tires associated with the vehicle may be handled in various ways, such as by measurement of remaining tread depth, removal from the vehicle, relocation on the vehicle, replacement, or repair. Various pieces of automotive service equipment, such as tire changers, wheel balancers, brake lathes, inspection systems, and wheel/ADAS alignment fixtures located through the service shop may be involved in the vehicle inspection and/or service procedures. Over the course of a vehicle service procedure, the individual wheels and/or tires associated with the vehicle may be separated from the vehicle and moved to different locations within the service shop, depending upon where a required piece of automotive service equipment is located. In a busy, multi-bay, service shop environment, it is not uncommon for wheels and/or tires associated with several different vehicles to be temporarily located in proximity to a piece of automotive service equipment, such as a wheel balancer or tire changer, awaiting service. Under such conditions, a technician must either keep track of which wheels and tires belong to specific vehicles by maintaining physical separation from other wheels and tires, or must provide some sort of temporary marking on the individual tires identifying the associated vehicle and/or placement position on that vehicle. Tracking the location of an individual tire or wheel assembly between various pieces of equipment within a service environment presents a challenge, and absent a log of detailed service notes, records of tire conditions and/or tire services completed for different vehicles and/or wheel assemblies may be missing or absent.

Individual tires are manufactured with limited tire identification data embossed or printed on the tire sidewall surfaces. Under controlled and ideal conditions, this information can be captured from the tires on a moving vehicle in a drive through inspection lane using imaging sensors and optical character recognition software, such as shown in U.S. Patent Application Publication 2021/0003481 A1 to Strege. Similarly, the tire sidewall data can be acquired by imaging sensors located on various pieces of automotive service equipment, such as wheel balancers, tire changers, and alignment racks, as described in "*Identification of Tire Production Data During Wheel Service Procedures*" published by IP.com as IPCOM000243934D. Non-optical systems can be utilized to store data in association with individual tires. For example, tires can be manufactured with, or have attached, radio-frequency identification devices (RFID) or tags. Various components of automotive service equipment configured with RFID readers can communicate with tire-associated RFID tags to either access or store data therein, such as shown in U.S. Pat. No. 6,982,653 B2 to Voeller. While the aforementioned RFID systems are capable of acquiring information associated with individual tires, such as for use during a tire or wheel service procedure, they fail to provide a solution for tracking or monitoring tires and/or vehicles within an automotive service environment and over extended periods of time.

Accordingly, there is a need within an automotive service environment for a system and method to monitor or track the physical location and/or condition of identified tires and an associated vehicle across multiple pieces of automotive service equipment within an automotive service shop environment, as well as for extended periods of time, such as over vehicle service intervals or tire operative lifespans.

BRIEF SUMMARY OF THE INVENTION

Briefly stated, the present disclosure sets forth a system and method for utilizing identification data uniquely associated with individual tires to monitor or track the physical location and/or condition of the individual tires and an associated vehicle across multiple pieces of automotive service equipment within an automotive premises, such as a vehicle service shop, refueling station, or parking lot. The identification data is used to generate an accessible record or log associated with the tire and accompanying vehicle. When a piece of automotive service equipment identifies an individual tire during a service procedure, such as by reading a tire identifier from an RFID tag, an engraved QR code, or an embossed serial number, the tire identifier is communicated to a cloud-based data management system either to retrieve records associated with the tire identifier, or for inclusion in a record associated with one or more of the automotive service equipment, the service shop, the individual tire, an associated vehicle, or a customer. The stored records provide a service history for the individual tires, and maintain a log of the physical location of each tire (and associated vehicle) within the service shop environment over a period of time.

In one embodiment of the present disclosure, a vehicle drive-through inspection system is configured with sensors to acquire a tire identifier from at least one wheel on a vehicle passing through the system. Identification of a tire, combined with a vehicle identifier such as VIN, enables generation of a record of which tires are installed on, or associated with, the vehicle upon arrival at the vehicle drive-through inspection system. A data management system in networked communication with the vehicle drive-through inspection system receives sensor data associated with the inspection system and the vehicle, including a listing of the identified tires, which is used to recall related tire information, conduct tire comparisons, and to generate reports and/or warnings for presentation to an operator or vehicle owner/driver.

In a further embodiment of the present disclosure, a wheel balancing machine includes at least one sensor configured to acquire tire identifying data from a wheel assembly undergoing an imbalance measurement or correction procedure. A data management system in networked communication with the wheel balancing machine receives a report on each tire/wheel assembly service conducted by the tire changing machine, including the identifying data from any tire which is demounted, remounted, or replaced during the tire/wheel assembly service, enabling the creation of tire service reports, procedure logs, and any required tire-related warnings for an operator.

In a further embodiment of the present disclosure, a tire changing machine includes at least one sensor configured to acquire tire identifying data from a wheel assembly undergoing a tire mount/demount procedure. A data management system in networked communication with the tire changing machine receives a report on each tire/wheel assembly service conducted by the tire changing machine, including of the identifying data from any tire which is demounted, remounted, or replaced during the tire/wheel assembly service, enabling the creation of tire service reports, procedure logs, and any required tire-related warnings for an operator.

In a further embodiment of the present disclosure, a vehicle wheel alignment/ADAS inspection system and/or lift rack includes at least one sensor configured to acquire tire identifying data from each wheel assembly on a vehicle undergoing an alignment, an ADAS system inspection/adjustment, or lift-rack related service. A data management system in networked communication with the vehicle wheel alignment/ADAS inspection system and/or lift rack receives a report on each vehicle inspection and/or service, including the identifying data from each wheel assembly observed during an inspection and/or service, enabling the creation of vehicle service reports, procedure logs, and any required tire-related warnings for an operator.

In a further embodiment of the present disclosure, an on-car brake lathe includes at least one sensor configured to acquire tire identifying data from a wheel assembly before removal from a vehicle undergoing a brake rotor resurfacing procedure. A data management system in networked communication with the on-car brake lathe receives a report on each brake service conducted by the on-car brake lathe, including the tire identifying data for the serviced wheel assembly, enabling the creation of vehicle service reports and logs.

In a further embodiment of the present disclosure, a cloud-based data management application is configured to receive vehicle and tire identification data from various sources within an automotive service environment. The data management application utilizes the received vehicle and tire identification data to compile vehicle and tire service records, generate reports, track and monitor vehicle and/or tire conditions, and to identify tends, vehicle and/or equipment statistics, and/or business opportunities related to individual vehicles, identified tires, automotive service equipment, and service shops.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 1 is a chart illustrating prior art standardized data stored in a tire RFID tag;

Corresponding reference numerals indicate corresponding parts throughout the several figures of the drawings. It is to be understood that the drawings are for illustrating the concepts set forth in the present disclosure and are not to scale.

Figure 2:
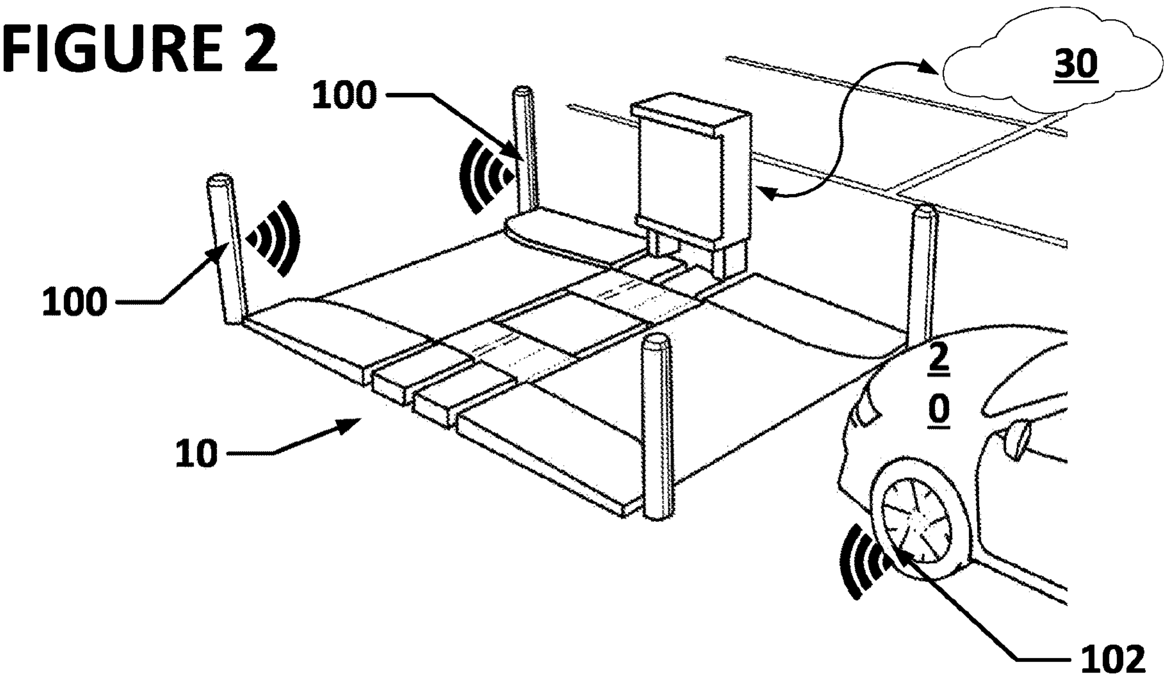
FIG. 2 is an illustration of a drive-through vehicle inspection system incorporating RFID sensors to acquire tire identification data.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

A variety of techniques exist for non-contact identification of individual tires, such as those mounted on, or associated with, a vehicle undergoing a service or inspection in an service shop. For example, radio-frequency identification (RFID) tags embedded within, or attached to an inner surface of a tire provide unique identification for individual tires using a SGTIN96 code, which can be recalled utilizing an appropriate RFID scanner or sensor on a vehicle service system, such as shown in U.S. Pat. No. 6,822,582 to Voeller and U.S. Pat. No. 6,982,653 to Voeller, both of which are herein incorporated by reference. Storing and communicating tire data with the use of RFID tags in tires may be done in accordance with the ISO 20909-ISO 2212 and SAE/USCAR-39-1 standards, such as shown in FIG. 1.

In a further example, non-contact identification of individual tires is achieved utilizing optical sensors to read numeric sequences, bar codes, or QR codes embossed, engraved, or printed on the tire sidewall surfaces. An exemplary system for reading and utilizing QR codes to identify individual tires on a moving vehicle passing through an inspection system is shown in U.S. Patent Application Publication No. 2021-0003481 A1 to Strege, which is herein incorporated by reference. Exemplary systems for optical character recognition of tire sidewall markings, such as alpha-numeric Department of Transportation (DOT) codes or Tire Identification Numbers (TINs) are described in the publication "Identification of Tire Production Data During Wheel Service Procedures", published as IP.com publication IPCOM000243934D, and which is herein incorporated by reference.

Uniquely identifying the individual tires of a vehicle facilitates tracking of both the individual tires and an associated vehicle within an automotive service premises, such as a shop environment, refueling station, or parking lot, by detecting and reporting to a centralized data management application a tire presence at individual sensors, workstations, or pieces of service equipment. In a first embodiment, identification data uniquely associated with individual tires is utilized to monitor or track the physical location of an associated vehicle on the premises. Sensors, such as RFID readers, are disposed about an automotive service premises, preferably at locations through which a vehicle is likely to pass.

In one embodiment, as seen in FIG. 2, a vehicle drive-through inspection system 10, such as a Hunter Engineering Company Quick Tread® inspection lane, through which a vehicle 20 entering a service area is driven to measure tire tread depths, is configured with one or more RFID readers 100 to activate RFID tags 102 incorporated into the tires of a vehicle passing through the system. Preferably, the RFID reader 100 is configured with either a directional antenna/emitter and/or optimized transmit power levels to limit the spatial volume within which the system will activate an RFID tag 102, thereby reducing the chance for acquiring data from RFID tags 102 in adjacent service areas. Unique tire identification data received from the activated RFID tags 102 is associated with the vehicle 20 as it is identified by the drive-through inspection system 10, and communicated to a networked data management system 30. An exemplary networked data management system 30 is the cloud-based HunterNET® system provided by Hunter Engineering Company of St. Louis, Missouri which provides an accessible database of vehicle service records.

Figure 3:
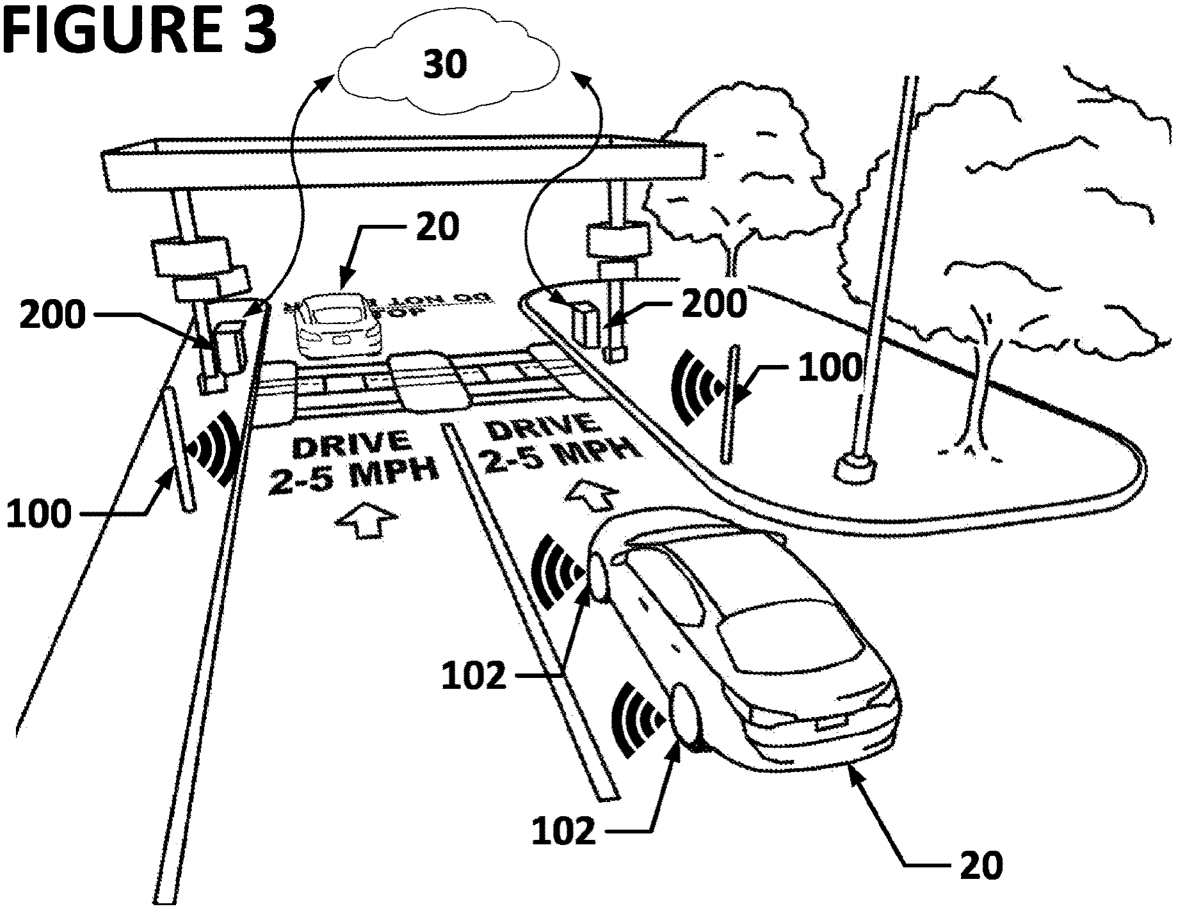
FIG. 3 is an illustration of a drive-through vehicle identification system located in an entrance drive, incorporating RFID sensors to acquire tire identification data from incoming vehicles.

As shown in FIG. 3, vehicle entrances to parking lots or service bays may be configured with vehicle identification systems 200 which include at least one RFID reader 100. Each RFID reader 100 is disposed in proximity to a vehicle travel path, such as a doorway, to activate RFID tags 102 incorporated into the tires of a vehicle 20 passing in close proximity. Preferably, each RFID reader 100 in the vehicle identification system 200 is configured with either a directional antenna/emitter and/or optimized transmit power levels to limit the spatial volume within which an RFID tag 102 is activated, thereby reducing the chance for acquiring data from RFID tags 102 in adjacent service areas. Optionally, the vehicle identification system 200 incorporates components for vehicle identification, such as a camera-based license plate recognition system or a VIN barcode scanner. When a vehicle 20 passes through the vehicle identification system 200, the associated RFID readers 100 are triggered to activate RFID tags 102 incorporated into the tires of the vehicle. Unique tire identification data received from the activated RFID tag(s) 102 is communicated to a networked data management system 30, together with the vehicle identification data, establishing a log entry associated with the presence of the vehicle and the identified tires at the location of the vehicle identification system 200.

In an additional embodiment, individual surface-mount or drive-over sensor modules 300, are disposed at selected locations about the premises of the automotive service shop, such as at parking lot entrances, driveways, etc. When a vehicle 20 passes over the surface-mount or drive-over sensor module 300, an RFID reader 100 within the module is triggered to activate RFID tags 102 associated with the tires of the passing vehicle. Preferably, the RFID reader 100 is configured with either a directional antenna/emitter and/or optimized transmit power levels to limit the spatial volume within which an RFID tag 102 can be activated, thereby reducing the chance for acquiring data from RFID tags 102 in adjacent service areas. Unique tire identification data received from one or more of the activated RFID tags 102 is communicated to a networked data management system 30, either by a direct connection or by a wireless communications link, establishing a log entry associated with the presence of the identified tire(s) at the location of the sensor module 300. If the identified tires have already been associated with a specific vehicle 20, the presence of the vehicle is logged accordingly. In the event that the identified tire(s) are not yet associated with a specific vehicle 20, such as a first-time customer driving into the parking lot, or a vehicle with a new set of tires, the networked data management system 30 is configured to establish a new log associated with the identified tire(s), which can be merged or combined with vehicle records when the identified tire(s) are subsequently associated with a specific vehicle 20.

Figure 4:
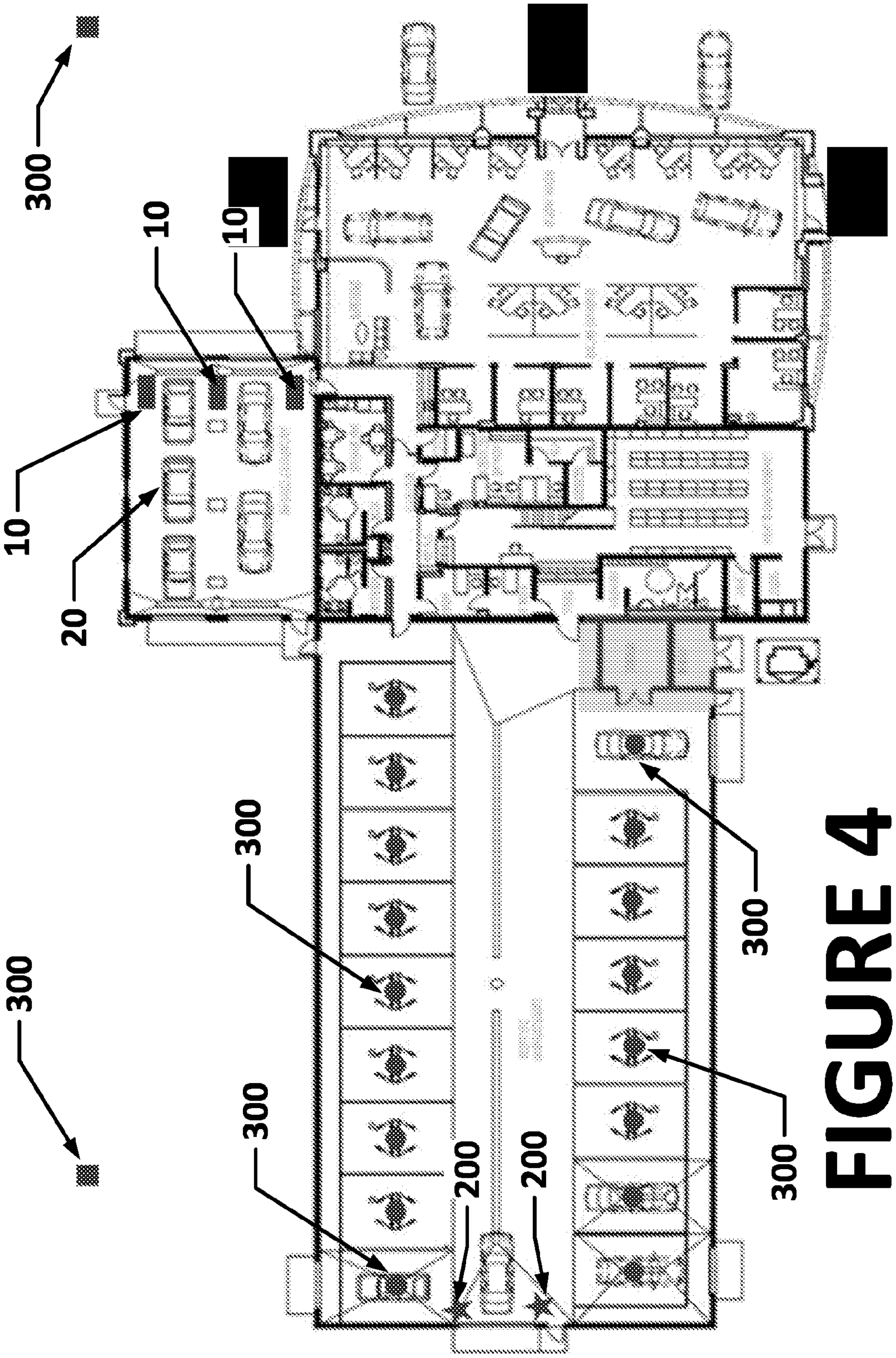
FIG. 4 is a plan view of a large vehicle service center, illustrating exemplary placement of RFID sensor systems to track vehicle and/or tire locations throughout the premises.
Figure 5:
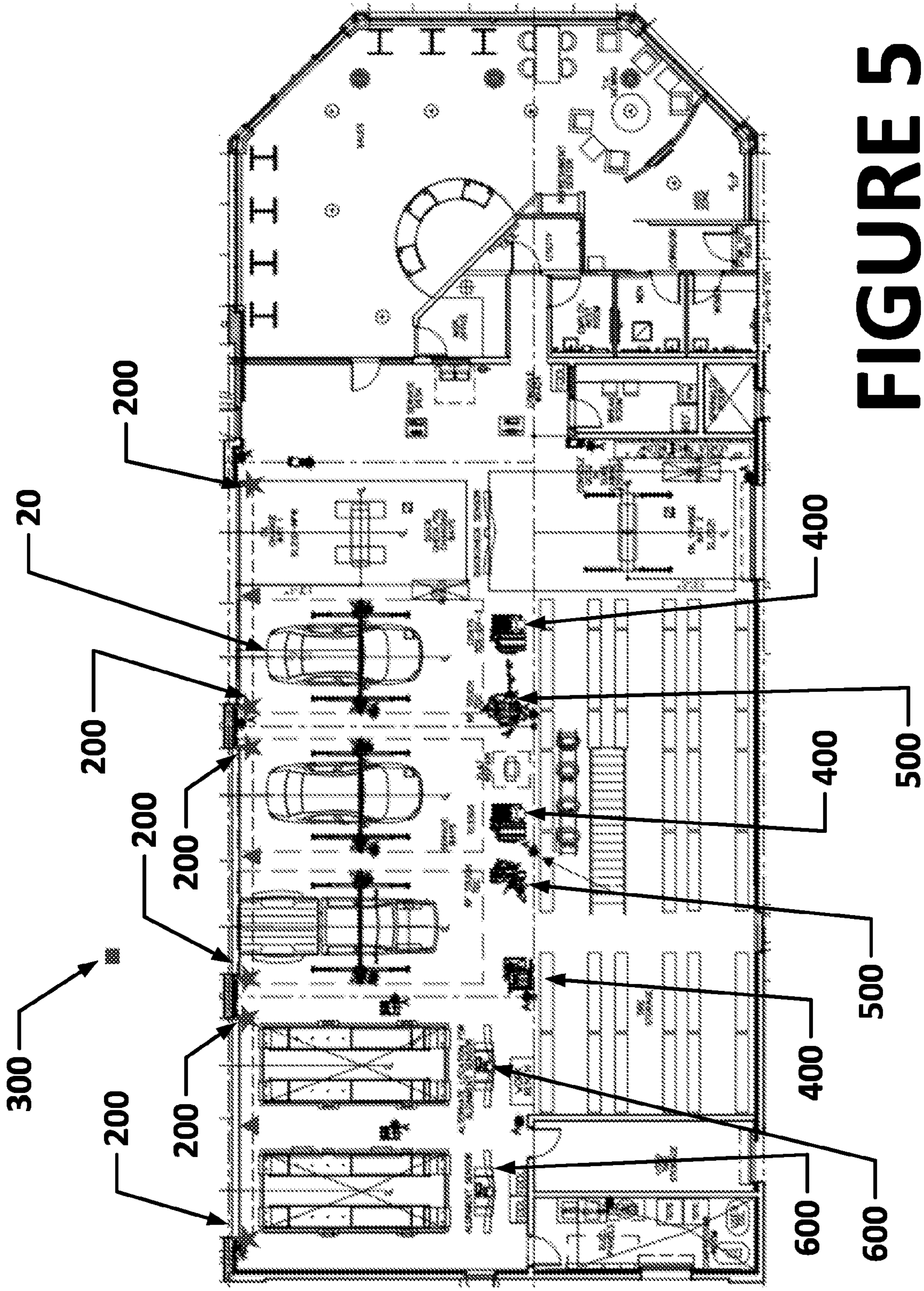
FIG. 5 is a plan view of a small vehicle service center, illustrating exemplary placement of RFID sensor systems to track vehicle and/or tire locations throughout the premises.

Strategic placement of systems 10, 200, and 300 having RFID readers 100 throughout an automotive service premises, such as shown in FIGS. 4 and 5, provides a networked data management system 30 with the ability to monitor the location of individual tires having RFID tags 102, together with associated vehicles 20. As a vehicle is moved around the premises, into an inspection lane, into a service area, and/or an individual service bay, proximally located systems 10, 200, and 300 register the presence of the RFID tags 102 in one or more of the vehicle tires, and report to the networked data management system 30. The reported data is logged and utilized to generate vehicle progress reports, shop efficiency (as represented by vehicle time-in to vehicle time-out for a service bay), and real-time status updates to shop managers and vehicle owners. For example, a suitably configured networked data management system 30 generates text messages or e-mail communications to a shop manager or vehicle owner in response to an identified change of location for a vehicle within the automotive service shop environment. These text messages or e-mail communications can be tailored to identify the specific location of the vehicle (as indicated by the specific system 10, 200, and 300 which reported the data), as well as the specific time. The shop manager or owner can be apprised of individual events, for example "Your vehicle entered the wash bay at 1:00 pm", "Your vehicle left the alignment service bay at 2:30 pm", "Your vehicle is located at parking slot A23", etc.

Within the service shop environment, various pieces of automotive service equipment such as wheel balancers 400, tire changers 500, and wheel alignment systems 600 are operatively coupled to a communications network for transferring data to the networked data management system 30. In further embodiments of the present disclosure, automotive service equipment such as wheel balancers 400, tire changers 500, wheel alignment system 600 and other devices are configured to utilize tire and/or vehicle identifying data to store tire and/or vehicle data in an associated record, retrieve records associated with the identified tire and/or vehicle, or to generate associated reports using stored records. It will be recognized that records associated with tire and/or vehicle identifying data stored in a networked data storage system may be accessed from automotive service equipment located at different authorized automotive service shops, such as from different locations of a tire service provider.

Figure 6:
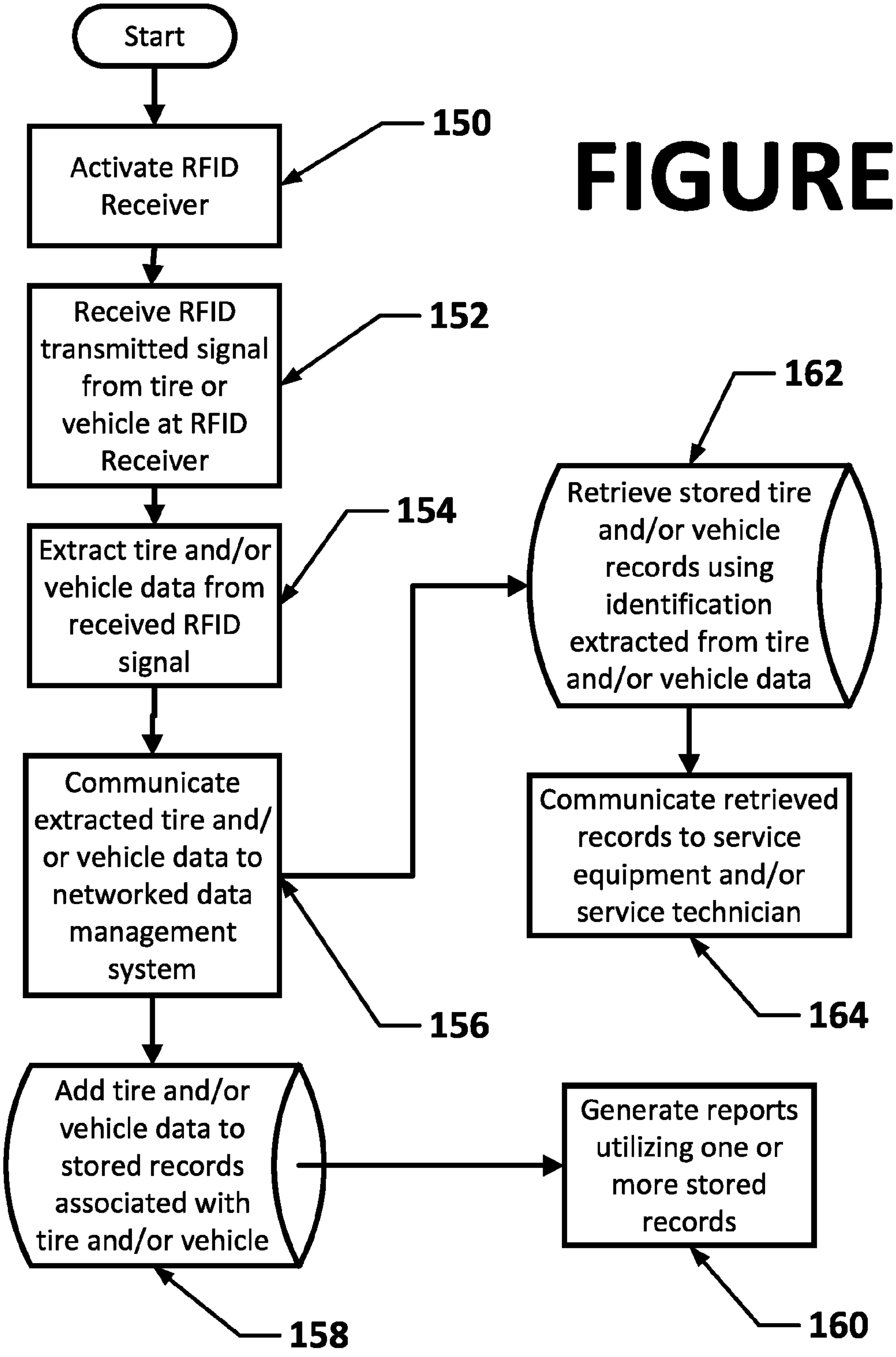
FIG. 6 is a flow chart illustrating exemplary procedures for utilizing tire and/or vehicle data received from a tire or vehicle RFID tag.

An exemplary process for utilizing tire and/or vehicle identifying data is shown in FIG. 6. The process begins when a tire or vehicle having an associated RFID tag is positioned within operative proximity to automotive service equipment configured with an RFID receiver. Preferably, each RFID reader 100 is configured with either a directional antenna/emitter and/or optimized transmit power levels to limit the spatial volume within which an RFID tag 102 can be activated, thereby reducing the chance for acquiring data from RFID tags 102 in adjacent service areas or at adjacent pieces of automotive service equipment. Upon activation (150) of the RFID receiver, an RFID tag in operative proximity will transmit a signal containing stored data to the RFID receiver (152).

The received signal is processed to extract data associated with the tire or vehicle (154), and the extracted data, together with optional data from the service equipment such as measurements or procedure results, is communicated from the service equipment to a networked data management system (156). Depending upon the particular service procedure being carried out by the service equipment, the communicated data is used to (a) create (or supplement) a record in the data management system associated with the tire or vehicle (158) from which reports can be generated (160), or (b) to retrieve a stored record associated with the identified tire or vehicle (162), which is then communicated to either the service equipment or a service technician (164). The stored records provide a service history for the individual tire or vehicle, and identify a reported physical location of the tire and/or vehicle within the service shop environment or a networked chain of automotive service shops.

In one embodiment, the networked data management system 30 is configured with software instructions to utilize the reported data to respond to queries for locating individually identified tires by returning data identifying at least the most recent reported physical location of the tire. Optionally, the networked data management system 30 is configured to automatically generate notifications for communication to selected recipients, such as customers, whenever a reported physical location of a tire within the service shop environment changes, or if an old tire is replaced by a new tire for installation on the vehicle, enabling the recipient to monitor the progress of a vehicle service or repair procedure as it progresses between different pieces of service equipment.

Data associated with an activated RFID tag 102 on a tire or vehicle communicated to the networked data management system 30 from a drive-through vehicle inspection system 10 may be utilized for a variety of purposes in addition to tracking the location of a tire or vehicle 20. The data received from the inspection system 10, including tire and vehicle identifiers, is used by the networked data management system 30 to recall related tire information, conduct tire comparisons, and to generate inspection reports, service reports, and/or warnings for an operator. For example, vehicle and tire identifying data received from the drive-through inspection system 10 is compared by the networked data management system 30 to previous records of the vehicle 20 in order to identify changes in either a position of individual tires on the vehicle (indicating possible tire rotations), or a replacement of individual tires on the vehicle. Verifying a presence of previously identified tires on a vehicle 20 in a vehicle rental environment provides a rental service with security against tire-swapping by customers. In a service shop environment, verifying the presence of previously identified tires on the vehicle 20 allows the service shop to confirm that the tires undergoing a warranty service are tires that the customer purchased under a warranty contract. The networked data management system 30 can be configured to generate a verification record for tire replacements and/or tire rotations performed on the vehicle while in the service shop by comparing tire identifying data received upon arrival of the vehicle 20 at the service shop premises with tire identifying data received as the vehicle 20 departs from the service shop.

In another example, vehicle and tire identifying data received at the networked data management system 30 from the drive-through inspection system 10 is compared to previous records associated with the vehicle in order to track tire tread wear, either in relation to vehicle miles driven, or to an elapsed period of time. In one embodiment, the networked data management system 30 is configured with software instructions to utilize information identifying the specific brands of individual tires, as well as the vehicle 20, together with measurements of tire tread wear to establish tire-brand and/or vehicle-specific future tire wear prediction curves. If a tire age threshold is established, the networked data management system 30 can be configured to generate a warning message to an operator or customer when an identified tire is noted to have exceeded the age threshold and should be replaced. Similarly, if an identified tire is matched to a listing of stolen tires or tires recalled by a manufacturer, the networked data management system 30 will generate a warning message to the operator listing the observed issues. In the event the customer elects to replace a recalled tire, or declines to do so, the networked data management system 30 is configured to enter the customer's choice in a vehicle and/or tire service record.

In a further example, vehicle and/or tire identifying data received at the networked data management system 30 from the drive-through vehicle inspection system 10 is used by the networked data management system 30 to identify the type and/or size of each installed tire on the vehicle 20, either directly from the received tire identifying data, or via a table lookup using the received tire identifying data. In the event a mismatched (or out of season) tire type (i.e., snow tires, mud tires, all-season tires, summer tires), or mismatched tire size in the installed tires on the vehicle 20 is identified, the networked data management system 30 will generate a warning message to the operator, enabling the service shop to offer corrective services to the customer.

Figure 7:
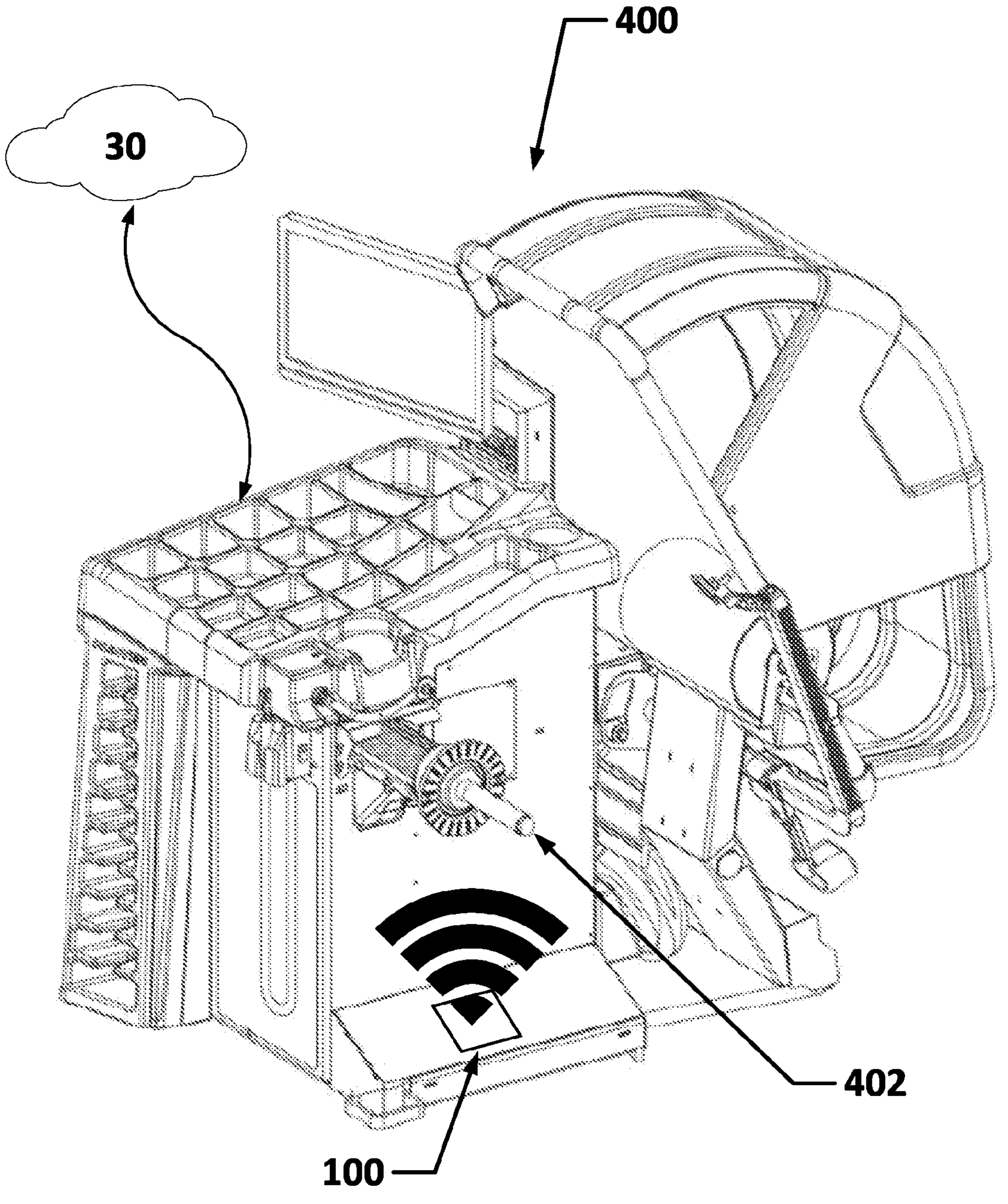
FIG. 7 is an exemplary wheel balancing machine configured with an RFID reader to receive data from an RFID tag associated with a tire undergoing an imbalance measurement procedure.

In a further embodiment of the present disclosure, a wheel balancing machine 400 in an automotive service shop, such as shown in FIG. 7, is configured with at least one RFID reader 100 configured to acquire tire identifying data from an RFID tag 102 associated with a tire or wheel assembly secured to the balancer spindle shaft 402 for an imbalance measurement or correction procedure. Data acquired by, and generated by the wheel balancing machine 400 is communicated to the networked data management system 30. The communicated data may include a report on each tire and/or wheel assembly service conducted by the wheel balancing machine 400, including an identification of any tire component of wheel assembly undergoing an imbalance measurement or correction, enabling the networked data management system 30 to create tire service reports (before and after measurements), procedure logs, updated vehicle records (i.e., associating individual tires with a specific vehicle and/or wheel position on the vehicle), and any required tire-related warnings for an operator.

In one embodiment, the wheel balancing machine 400 is configured to utilize tire identifying information to recall, via the networked data management system 30 and/or an accessible database, data associated with the identified tire to adjust settings and/or procedures on the wheel balancer system during service of the tire/wheel assembly. For example, upon detecting a change in the tire identifying data, the wheel balancing machine 400 is configured to identify the presence of a new tire, and reset/restart the tire/wheel assembly imbalance measurement or correction procedures. In a further example, tire identifying data is utilized by the wheel balancing machine 400 to recall, from the networked data management system 30, tire construction and configuration information, enabling the wheel balancer to switch operating modes and/or procedures to accommodate run-flat tires, medium duty vehicle tires, and to set imbalance correction weight rounding amounts or imbalance threshold limits.

Tire identifying information may be further utilized by the wheel balancing machine 400 to record measurements of the tire/wheel assembly acquired during a tire and/or wheel assembly service procedure. For example, imbalance measurements, current outer diameter (varying due to tread wear over time), wheel assembly radial force variations, and wheel assembly lateral force measurements can be measured, communicated to the networked data management system 30, and stored in an accessible database in association with the tire identifying information received from the RFID tag 102 associated with a tire or wheel assembly. These stored measurements can be recalled during subsequent service procedures on the associated tire and/or vehicle by the wheel balancing machine 400 or another piece of automotive service equipment in communication with the accessible database.

During a tire and/or wheel assembly service procedure, a wheel balancing machine 400 configured with an RFID antenna 100 of sufficient sensitivity to resolve a spatial location of an RFID tag 102 associated with the tire undergoing service can utilize the tire-identifying RFID tags to determine the facing direction of the tire on the wheel assembly undergoing service, as well as the rotational phase of the tire relative to the wheel rim. Changes in the strength of the signal returned from the RFID tag 102 to the RFID antenna 100 will vary with the distance between the tag and the antenna. As the wheel assembly is rotated about an axis on the balancer spindle shaft 402, a cyclical variation in the returned signal strength can be observed if the RFID antenna is sufficiently sensitive, representing the rotational position of the RFID tag 102 (and hence the tire) relative to the RFID antenna 100. Changes in the rotational phase of the tire relative to the wheel rim during a service procedure observed by the wheel balancing machine 400 may indicate a slippage condition, and trigger the wheel balancing machine 400 to generate a warning to the operator before continuing any service procedures.

Figure 8:
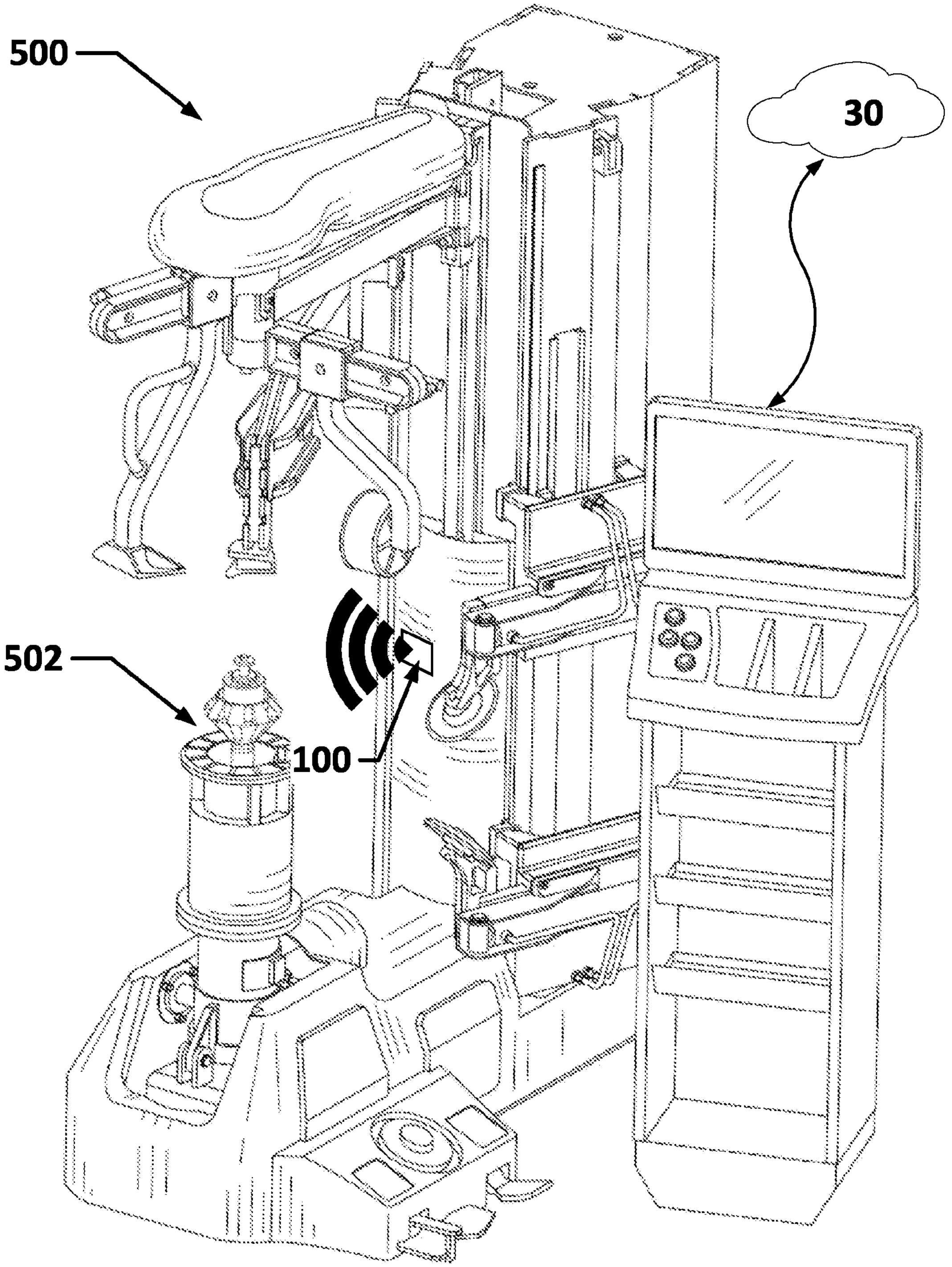
FIG. 8 is an exemplary tire changing system configured with an RFID reader to receive data from an RFID tag associated with a tire undergoing an mount/demount procedure.

In a further embodiment of the present disclosure, a tire changing machine 500 in an automotive service shop, such as shown in FIG. 8, is configured with at least one RFID reader 100 to acquire tire identifying data from an RFID tag 102 associated with a tire or wheel assembly secured to the spindle shaft 502 fora tire mount/demount procedure. A networked data management system 30 in communication with the tire changing machine 500 receives a report from the tire changer processing system on each identified tire/wheel assembly which is serviced. These reports may include an identification of the tires which are demounted, remounted, or replaced, enabling the creation of tire service reports, procedure logs, and tire-related warnings for an operator. The stored measurements can be recalled and utilized during subsequent service procedures on the associated tire and/or vehicle by the tire changing machine 500 or another piece of automotive service equipment in communication with the accessible database.

In one embodiment, the networked data management system 30 receiving tire identifying data from the tire changing machine 500, together with tire service information, is configured to utilize the received tire identifying data to locate stored records for a vehicle 20 previously associated with the identified tire. The networked data management system 30 updates stored vehicle records using tire service information received from the tire changing machine 500. These updates may include an identification of a replacement tire, tire parameters (i.e., size, brand, style, etc.), a listing of procedure performed on the tire by the tire changing machine 500 (i.e., force-matching, bead massage, etc.), and a record of inflation pressures for the tire.

In a further embodiment, the networked data management system 30 receiving tire identifying data from the tire changing machine 500 is configured to utilize the received information to verify the identified tire meets OEM requirements for the vehicle 20 on which it is to be installed, i.e., verifying the tire load rating, tire inflation pressure, tire size, tire style, and matches to other tires known to be currently installed or associated with the vehicle 20. Tire identifying information associated with a replacement tire communicated from the tire changing machine 500 to the networked data management system 30 is association with the vehicle 20 and/or customer in an accessible tire database (NHTSA or tire manufacturer), and a record of discarded tires is updated in the event a tire is deemed worn out, damaged, or defective.

In a further embodiment, the networked data management system 30 receiving tire identifying data from a tire changing machine 500 is configured to utilize the received information to recall tire specific parameters from an accessible database for communication back to the tire changing machine 500 to configure settings on the tire changing machine 500 to perform a tire service procedure. For example, the networked data management system 30 may utilize the tire identifying information to recall an ideal or maximum tire inflation pressure, which is communicated back to the tire changing machine 500 as an inflation target or inflation limit, preventing under- or over-inflation conditions during a tire inflation procedure. Similarly, the networked data management system 30 may utilize the tire identifying information to recall recommended settings for the tire changing machine 500 to use when mounting or demounting the specific type of tire to a wheel rim. These recommended settings may include an identification of the outward-facing side of the tire, a required use of pusher tools, tool force limits, tool movement limits, TPMS sensor avoidance procedures, etc. Under some conditions, the networked data management system 30 is configured to return a warning to the operator of the tire changing machine 500, if, for example, an identified tire size is a potential mismatch to the wheel rims on an associated vehicle 20, as can occur when mounting 17.5" and 19.5" truck tires.

Figure 9:
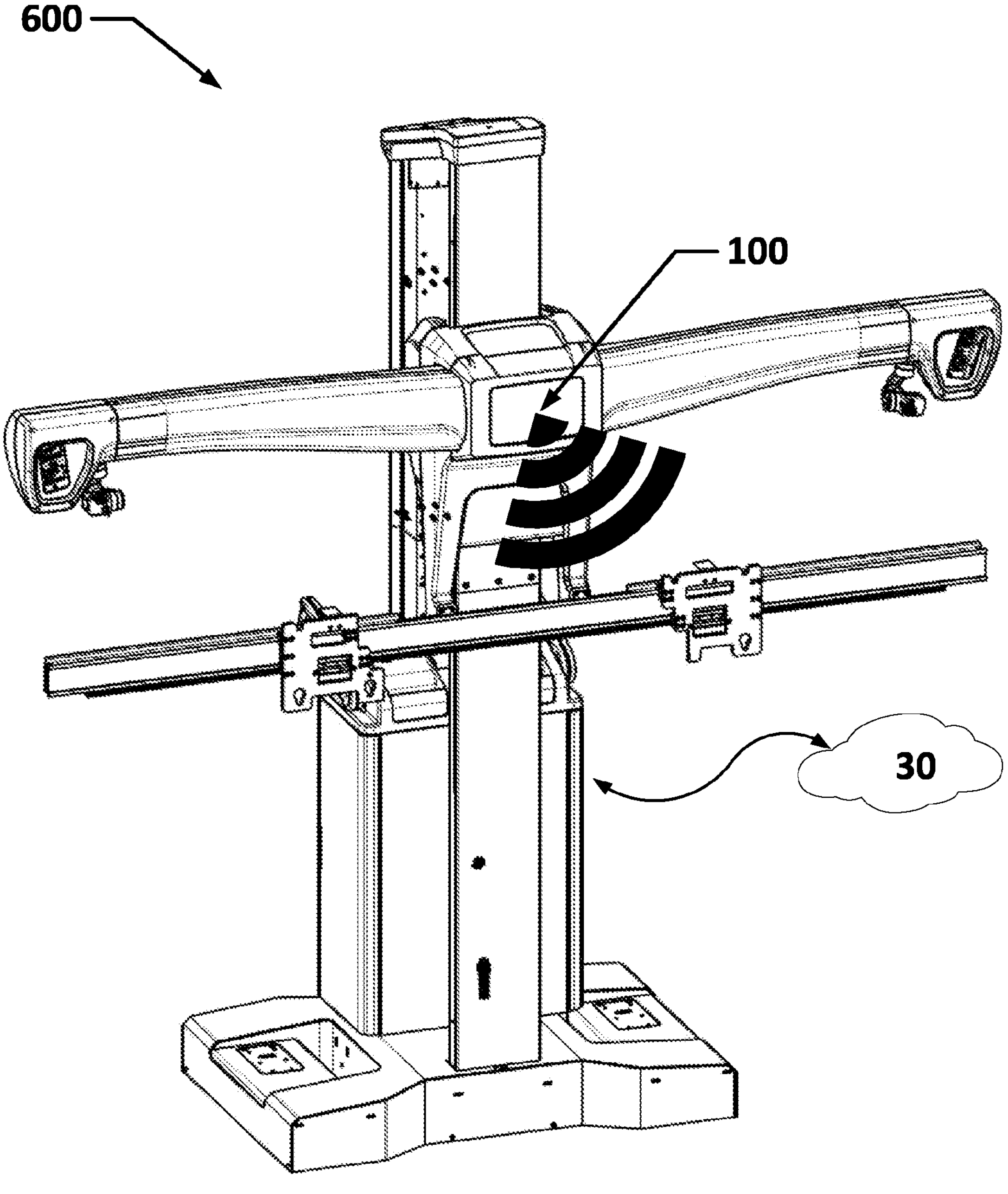
FIG. 9 is an exemplary vehicle wheel alignment measurement/ADAS service fixture configured with an RFID reader to receive data from RFID tags associated with the vehicle undergoing a wheel alignment service or ADAS service.

In a further embodiment of the present disclosure show in FIG. 9, a wheel alignment/ADAS inspection system 600 is configured with at least one RFID reader 100 to acquire tire identifying data from an RFID tag associated with a tire of a wheel assembly on a vehicle 20 undergoing a wheel alignment service, or an ADAS system service. The networked data management system 30 in communication with the wheel alignment/ADAS inspection system 600 and/or lift rack receives a report on each vehicle inspection and/or service, including an identification of the tires associated with the vehicle, enabling the creation of vehicle service reports, procedure logs, and required tire-related warnings for an operator.

When a vehicle 20 is brought into a service bay in proximity to the wheel alignment/ADAS inspection system 600, tire identifying information is acquired by the associated RFID reader 100 for one or more tires on the vehicle 20. In one embodiment, the wheel alignment/ADAS inspection system 600 communicates the acquired tire identifying data to the networked data management system 30. The data management system 30 in turn utilizes the received data to recall data for a vehicle 20 previously linked to the tire identifying data, such as by means of a drive-through vehicle inspection system 10 or vehicle identification system 200. The returned vehicle data may include vehicle identifying information, manufacturer recommended alignment settings, previous alignment measurements and/or other relevant vehicle service history facilitating service or inspection by the wheel alignment/ADAS inspection system 600. For example, tire-specific data communicated to the networked data management system 30 and stored in association with a vehicle record by other vehicle service devices such as tire pressure, tire/wheel assembly lateral force and conicity measurements, and/or tire placement positions may be relevant to optimizing the alignment of the vehicle 20. Upon completion of a vehicle service or inspection, the wheel alignment/ADAS inspection system 600 may be configured to convey results and/or status data relevant to the vehicle 20 and individually identified tires to the networked data management system 30 for inclusion in the associated vehicle records.

In a further embodiment of the present disclosure, additional pieces of automotive service equipment, such as, but not limited to, fuel pumping stations, electrical battery recharge stations, brake lathes, lift racks, engine diagnostic system, frame straighteners, etc. are configured with at least one RFID reader 100 to acquire tire identifying data from an RFID tag associated with a tire of a wheel assembly on a vehicle 20 undergoing a service or inspection. For some equipment, such as lift racks, the RFID reader 100 may be disposed in proximity to vehicle wheel locations, while other equipment may utilize a hand-held RFID scanner which is operatively in communication with a processing system of the equipment to acquire tire-identifying data from a tire RFID tag. The networked data management system 30 in communication with the equipment receives at least the tire-identifying data, enabling the creation or supplementing of vehicle service reports and logs. For example, a processing system of an on-car brake lathe may be configured to utilize acquired tire identifying data to recall, from the networked data management system 30, data associated with the vehicle 20 which is undergoing a brake rotor resurfacing procedure. This recalled data may include a vehicle identification, as well as vehicle parameters relevant to the brake rotor resurfacing procedure, such as vehicle driveline configuration and/or brake rotor dimensions and resurfacing limits. Results of the brake rotor resurfacing procedure can be subsequently communicated to the networked data management system 30 for inclusion in records associated with the identified vehicle, establishing or updating a vehicle service history.

In a further embodiment of the present disclosure, the networked data management system 30 is configured to receive tire identification data from various sources within an automotive service environment, including from multiple related automotive service shops, and to utilize the received tire identification data, together with associated vehicle service and/or inspection data to compile reports and logs which may be utilized to improve vehicle services, track and monitor vehicle and/or tire conditions, and to identify tends and business opportunities related to vehicles, identified tires, and automotive service shops. Tracking the physical location of individual tires within an automotive service shop enables the networked data management system 30 to generate a record of events associated with the tracked tires, independent of any service logs manually recorded by a service technician. Customer wait times, service procedure durations, vehicle service comparisons, customer comebacks, etc. can be identified and recorded automatically by the networked data management system 30 without requiring technician input.

In a further embodiment, the networked data management system 30 is linked to multiple automotive service shops, such as within a dealer or service network, allowing for an aggregation of data across multiple physical locations to create a wide variety of reports, ranging from simple efficiency evaluations to complex vehicle-specific observations. Sufficient data can be acquired to generate records confirming specific procedures were performed, such a manufacturer required recall, as well as establishing records for warranty claims. A vehicle brought in for service at one location can be identified to the networked data management system 30 by the unique tire identifiers, allowing all service records for that vehicle, including those from other physical shop locations, to be recalled and made available to a service technician.

An exemplary method of the present disclosure for tracking a vehicle on an automotive service premises, comprises the steps of (1) acquiring at least one unique tire identification from an RFID tag affixed to a tire associated with a vehicle; (2) conveying the acquired unique tire identification to a networked data management system having an accessible data storage, together with an identifier for the vehicle; (3) storing the unique tire identification in the accessible data storage in association with the identifier for the vehicle; (4) responsive to a subsequent acquisition of the unique tire identification from the tire RFID tag by an RFID reader associated with either a physical location on the automotive service premises or an automotive service device, conveying the acquired unique tire identification to the networked data management system together with an identification of either the physical location or the automotive service device; (5) accessing, from the accessible data storage, the vehicle identifier associated with the conveyed unique tire identification; and (6) creating a time-stamped record in the accessible data storage associating the vehicle identifier and the identification of either the physical location or the automotive service device.

An additional step of the method may include compiling with the networked data management system, a plurality of the time-stamped records associated with a single vehicle identifier from the accessible data storage to establish a log for the vehicle, the log identifying at least the identified tire's physical location on the automotive service premises and/or the identified tire's presence at an automotive service device at discrete points in time. The time-stamped records may be communicated to an owner or operator of the vehicle.

In a further additional step of the method, acquiring each unique tire identification includes activating an RFID reader associated with a vehicle service system to emit an RFID activation signal encompassing an operative spatial volume in proximity to the vehicle service system within which an RFID tag will activate in response to said emitted signal. The operative spatial volume is selected to avoid overlapping the operative spatial volumes associated with other vehicle service systems within the automotive service premises. Optionally, the RFID reader is activated in response to a presence of the vehicle and/or a tire within the operative spatial An additional exemplary method of the present disclosure for tracking a vehicle tire comprises the steps of (1) acquiring at least one unique tire identification from an RFID tag affixed to a vehicle tire; (2) conveying the acquired unique tire identification to a networked data management system having an accessible data storage; (3) establishing a record of the unique tire identification in the accessible data storage; (4) responsive to a subsequent acquisition of the unique tire identification from said tire RFID tag by an RFID reader associated with either an automotive shop location or an automotive service device, conveying the acquired unique tire identification to the networked data management system together with an identification of either the automotive shop location or the automotive service device; and (5), creating an entry in the established record for the unique tire identification which includes at least a time-stamp and the identification of either the automotive shop location or the automotive service device. The established record may be utilized to generate, with the networked data management system, a log for the vehicle tire which identifies at least the presence of the vehicle tire at either an automotive shop location or at a specific automotive service device at discrete points in time. The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, microprocessor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for transferring vehicle identification data between automotive service devices having access to a networked data management system to enable tire and/or vehicle-specific service procedures, comprising:

acquiring, at a first automotive service device, at least one unique tire identification from an RFID tag affixed to a tire associated with said vehicle by operating an RFID reader having an associated directional antenna and/or an optimized transmit power level calibrated to limit a spatial volume proximate to said first automotive service device within which said RFID tag is activated to avoid overlapping an operative spatial volume associated with another automotive service device;

conveying said acquired unique tire identification to said networked data management system including an accessible data storage, together with an identifier for said vehicle;

storing said unique tire identification in said accessible data storage in association with said identifier for said vehicle;

responsive to a subsequent acquisition of said unique tire identification from said tire RFID tag at a second automotive service device by operating a second RFID reader having an associated directional antenna and/or an optimized transmit power level calibrated to limit a spatial volume proximate to said second automotive service device within which said RFID tag is activated to avoid overlapping an operative spatial volume associated with another automotive service device, conveying said unique tire identification to said networked data management system;

responsive to receipt of said subsequently acquired unique tire identification at said networked data management system, using said subsequently acquired unique tire identification to recall said associated identifier for said vehicle from said accessible data storage together with a stored record containing at least one automotive service device setting or configuration associated with said identified tire or vehicle;

communicating said recalled associated identifier for said vehicle and said stored record from said networked data management system to said second automotive service device; and wherein said second automotive service device responds to information contained within said communicated stored record by automatically selecting, altering, or configuring a service procedure for use with said identified tire or vehicle.

2. The method of claim 1 wherein said second automotive service device is a wheel balancing machine, and wherein said wheel balancing machine selects a tire type operating mode in response to said communicated stored record.

3. The method of claim 1 wherein said second automotive service device is a wheel balancing machine, and wherein said wheel balancing machine alters an imbalance correction weight rounding amount or imbalance threshold limit in response to said communicated stored record.

4. The method of claim 1 wherein said second automotive service device is a wheel balancing machine, and wherein said wheel balancing machine resets an imbalance measurement or correction procedure in response to said unique tire identification and said communicated stored record.

5. The method of claim 1 wherein said second automotive service device is a tire changing machine, and wherein said tire changing machine sets a tire inflation limit in response to said communicated stored record.

6. The method of claim 1 wherein said second automotive service device is a tire changing machine, and wherein said tire changing machine sets at least one force limit for tool operation during a tire mount/demount procedure in response to said communicated stored record.

7. The method of claim 1 wherein said second automotive service device is a tire changing machine, and wherein said tire changing machine selects at least one tire handling tool for use during a tire mount/demount procedure in response to said communicated stored record.

8. The method of claim 1 wherein said second automotive service device is a tire changing machine, and wherein said tire changing machine inserts a TPMS sensor avoidance step into a tire demount procedure in response to said communicated stored record.

9. A method for utilizing tire identification data to automatically configure a tire service device for a tire service procedure, comprising:

acquiring at said tire service device at least one unique tire identification from an RFID tag affixed to a tire positioned to undergo said tire service procedure on said tire service device by operating an RFID reader having a directional antenna and/or an optimized transmit power level calibrated to define a limited operative spatial volume proximate to said positioned tire within which said RFID tag is activated;

conveying said acquired unique tire identification from said tire service device to a networked data management system having an accessible data storage;

responsive to said conveyance, said networked data management system recalling from said accessible data storage at least one record associated with said unique tire identification which includes at least one of a tire-specific setting, tool movement or force limit, or operating procedural step for said tire service device;

communicating said recalled at least one record from said networked data management system for receipt by said tire service device altering said tire service procedure on said tire service device in response to said received at least one record by at least one of: setting a configuration for said tire service device; adding, changing, or removing a step in said tire service procedure corresponding to said at least one tire-specific setting or procedural step; or setting a tool movement or force limit on said tire service device; and executing said altered tire service procedure on said tire service device.

10. The method of claim 9 wherein said tire service device is a tire changer, and wherein at least one step of a tire changing procedure implemented by said tire changer is altered by said tire changer in response to said received at least one record.

11. The method of claim 9 wherein said tire service device is a wheel balancing machine, and wherein an imbalance correction limit for said wheel balancing machine is altered by said wheel balancing machine in response to said received at least one record.

12. The method of claim 9 wherein altering said tire service procedure includes said tire service device setting an operating limit for tire inflation.

13. The method of claim 9 wherein said tire service device is a tire changer, and wherein altering said tire service procedure includes said tire changer adding one or more TMPS sensor avoidance steps to said tire service procedure.

14. The method of claim 9 wherein said tire service device is a tire changer, and wherein altering said tire service procedure includes said tire changer setting a configuration by implementing at least one tool movement limit and/or at least one tool applied force limit.

* * * * *